May 29, 1934. G. R. STEUART 1,960,320
METHOD OF MANUFACTURING SULPHATE OF ALUMINA
Filed April 23, 1932
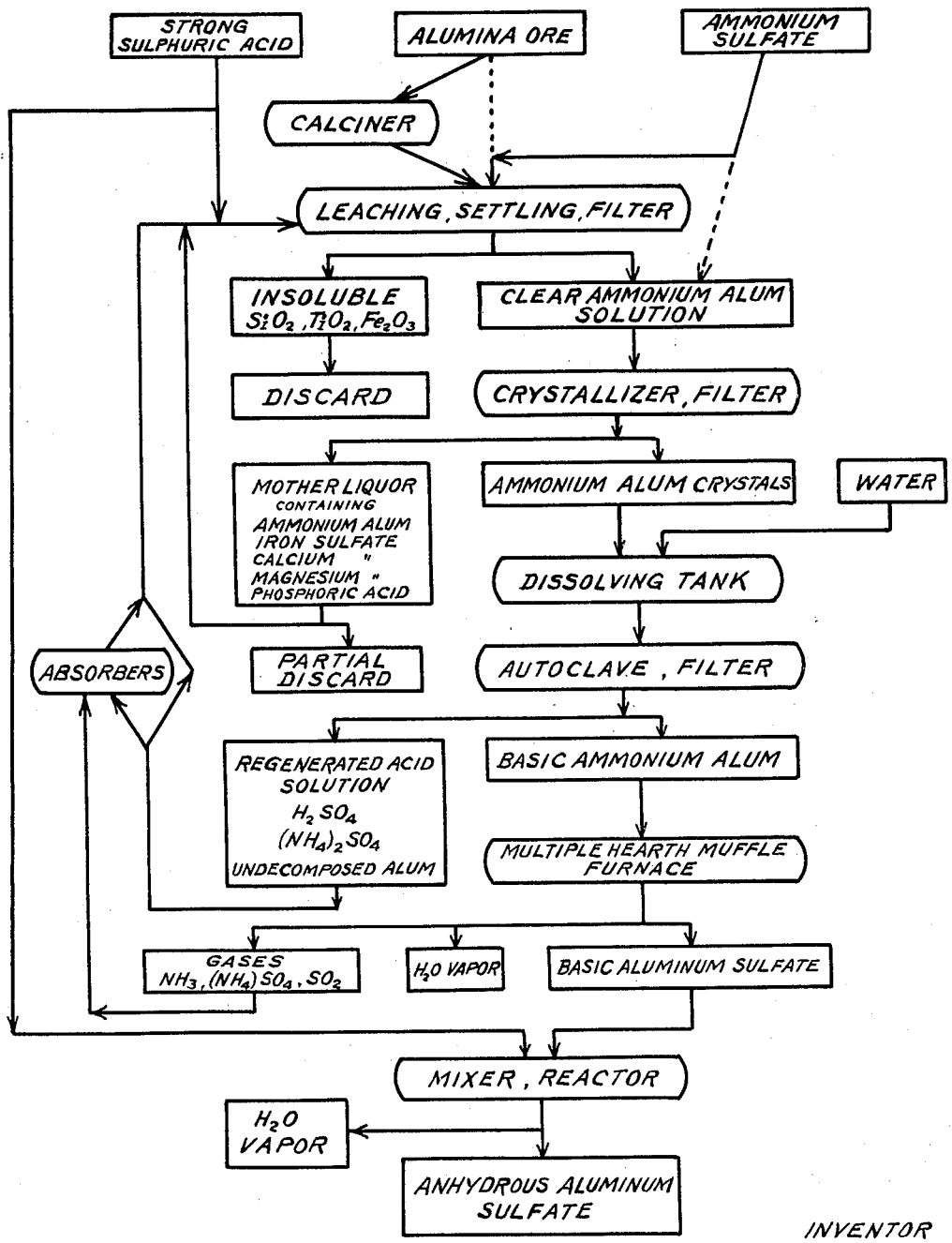
INVENTOR
Gordon R. Steuart, Deceased,
Katharine Steuart, Administratrix.
BY
ATTORNEY.
WITNESS:

Patented May 29, 1934

1,960,320

UNITED STATES PATENT OFFICE 1,960,320

METHOD OF MANUFACTURING SULPHATE OF ALUMINA

Gordon R. Steuart, deceased, late of Denver, Colo., by Katherine Steuart, administratrix, Denver, Colo., assignor, by mesne assignments, to Kalunite Company, a corporation of Delaware Application April 23, 1932, Serial No. 607,218

6 Claims. (Cl. 23—123)

The invention relates to the manufacture of sulphate of alumina and has for its object to provide a method in which an approximately anhydrous sulphate of alumina of great purity can be produced from a wide variety of ores of alumina at comparatively low cost. Broadly speaking, this invention may be said to involve the use as a starting material of a basic ammonium alum and to consist of the following steps:

First, the roasting of the basic ammonium alum at temperatures which will either dissociate or volatilize the sulphate of ammonia constituent of the alum, the ammonia and such sulphate of ammonia as is volatilized being recovered and brought into solution for such further use as may be desired. The roasting temperatures which have been found effective are from 400° to 620° C. and it is advisable to avoid the use of a higher temperature which will result in any material decomposition of the residual basic aluminum sulphate, which decomposition is apt to occur to some extent at temperatures in excess of 620° C.; lower roasting temperatures down to 400° C. may be used but will naturally require a longer time for the complete elimination of the ammonia. The next step of the process consists in treating the residual basic aluminum sulphate with sulphuric acid in such proportion as will bring about a material reduction in the basicity of the sulphate and render it water soluble. The basic sulphate of alumina resulting from the roasting process is approximately anhydrous and in treating it with sulphuric acid to reduce its basicity it is advisable that the acid should be introduced in such strength as will not result in any material increase in the combined water. It is preferred therefore to use acids of from 45° to 63° Baumé as the reaction of acids of these strengths with the basic sulphate of alumina will develop sufficient heat to drive off the water contained in the acid solution so that the combined water in the final product is not materially increased. If acid solutions of lower strength are used, the resultant aluminum sulphate will be partially hydrated but can be made anhydrous by roasting it to a temperature of approximately 300° C. to eliminate its combined water but this additional roasting would, of course, increase the expense of the process. With regard to the quantity of acid to be used in these treatments, it is generally advisable that only such quantity should be used as would result in the production of a slightly basic sulphate of alumina, though for some uses it is not considered undesirable that the sulphate of alumina produced should be neutral or even slightly acid. The sulphate of alumina produced by this process is remarkably free from impurities owing to the fact that the basic ammonium alum can be manufactured as a remarkably pure product and the process has the further advantage of producing the desired end product, sulphate of alumina, at low cost, largely because it does not involve the evaporation of water during the preparation of the product. While, as has been stated, the invention may be considered broadly as starting with a basic ammonium alum, for practical purposes it may be said to start with a treatment of an aluminum ore for the purpose of producing therefrom an ammonium alum free from impurities and from which a basic ammonium alum can be produced suitable for treatment in the described way for the production therefrom of an approximately anhydrous sulphate of alumina. Starting with the treatment of an ore of aluminum, the ore is first roasted to dehydrate it, where such a step is necessary, and to make it reactive with relatively dilute sulphuric acid. Then the roasted ore is treated with sulphuric acid in sufficient quantity to combine with the alumina and produce therefrom sulphate of alumina, adding sufficient sulphate of ammonia at some convenient stage of the treatment to bring its presence up to the quantity required in connection with the sulphate of alumina for the preparation of an ammonium alum. The sulphate of alumina and sulphate of ammonia are brought into solution and separated from the gangue material and subjected to such purifying processes as will result in a solution from which an ammonium alum can be crystalized with exclusion of deleterious impurities. The ammonium alum is then crystallized from the solution, washed and dissolved in water and the solution thus prepared is heated under pressure to a temperature of from 140° to 200° C., with the result that a basic ammonium alum is formed and precipitated from the solution, the sulphuric acid eliminated from the sulphate of alumina, together with a portion of the sulphate of ammonia and some sulphate of alumina remaining in solution. The finely divided precipitate is then washed, dried and treated for the production therefrom of sulphate of alumina, as described. The mother liquor of the basic ammonium alum and the solution of ammonia and sulphate of ammonia driven off by roasting from the basic alum, which are preferably absorbed in the mother liquor, are then used for the treatment of further bodies of ore, so that the regenerated sulphuric acid of the mother liquor and all of the ammonia not lost in manipulation are used cyclically in the treatment of the ore, from which it results that the process can be carried on at comparatively low cost.

The steps involving the treatment of the ore up to the production of the basic ammonium alum are not new with the aforesaid inventor but the employment of the described process of producing the basic alum from the ore, involving the cyclical use of the regenerated sulphuric acid and of the ammonia in connection with steps by means of which the sulphate of alumina is produced from the basic alum, are believed entirely new.

The anhydrous basic aluminum sulphate produced as above described, differs from somewhat similar compounds of sulphur trioxide and alumina in that it is entirely reactive with sulphuric acid and has also the characteristic of being reactive with water to produce a soluble basic aluminum sulphate of the approximate formula, $Al_2O_3.2SO_3$ which is dissolved in the water and an insoluble basic aluminum sulphate of the approximate formula $Al_2O_3.SO_3$ which is more basic than the original compound. In this reaction one-third of the alumina will be found in the water solution.

These identifying attributes of the anhydrous basic aluminum sulphate prepared from the basic ammonium alum are probably due to the particles retaining the structure of the particles of the basic alum from which they are derived. This anhydrous basic aluminum sulphate is believed a new compound and article of manufacture, for which protection in a copending application for Letters Patent is asked.

As an aid to the ready understanding of the process as above described, a drawing is provided which constitutes a part of this specification and is, in effect, a flow sheet, with each step of the process indicated and properly labeled so that no difficulty will be found in following the steps of the process by an inspection of the flow sheet.

As an example of the carrying out of this process, the aforesaid inventor started with a soft Georgia kaolin of the composition:

|  | Percent |
|---|---|
| Alumina | 38.01 |
| Water | 14.27 |
| Silica | 44.65 |
| Potash | 0.17 |
| Calcium oxide | 0.04 |
| Magnesia | 0.13 |
| Ferric oxide | 1.20 |
| Titania | 1.44 |
| Phosphorous pentoxide | 0.09 |

The kaolin is disintegrated and roasted for one hour at 600° C. in a rotary kiln, thereby eliminating the water content, increasing the rate of solution of the alumina in the acid, and decreasing the iron oxide solubility to 25% of the total present in the ore.

After cooling to 200° C., the calcine is treated with an acid solution containing 14% sulphuric acid and 6.3% ammonium sulphate in pachuca tanks arranged for counter-current flow. The reaction is complete in one hour. 90% of the alumina present in the calcine is dissolved as aluminum sulphate. Sufficient ore is used to neutralize the sulphuric acid of the leaching solution. The silica will be unattacked, and negligible traces only of potash and titania dissolved. About 50% of the calcium oxide, magnesia, and phosphorous pentoxide will be found in the neutral alum solution, which will be an approximately 55% ammonium alum solution.

A solution of barium sulphide is fed into the last pachuca tank to reduce the dissolved ferric sulphate to ferrous sulphate, in which case the alum crystallized will be iron-free.

The major portion of the insoluble residue is separated by setting in cones, which also function as washers. The finely divided insoluble residue which is not settled in the cones is removed from the liquor by filtration through filter presses, yielding a clear alum solution.

The clear ammonium alum solution discharged at a temperature of 80° C. from the filter presses, is cooled and crystallized in spray coolers. The crystals and mother liquor are separated by settling and filtration on a vacuum type filter, where the crystals are washed. About one-third of the mother liquor is cooled from room temperature to 0° C. by refrigeration, the alum crystals removed and the refrigerated liquor discarded. The remaining mother liquor is returned to the system and used to make up fresh batches of leach solution.

The alum crystals are dissolved by condensing steam to make an 80% solution, which is heated to 200° C. in an autoclave. 80% of the alumina will be precipitated as a basic ammonium alum with the simultaneous formation of a sulphuric acid-ammonium sulphate solution. After cooling, the precipitate is separated from the liquor by settling and filtration on a vacuum filter, on which the precipitate is washed. The mother liquor is returned to the leach system to make up the fresh solvent required. The precipitate discharged from the filter contains moisture up to 30% of the dry weight.

The moist basic ammonium alum is fed into a multiple muffle hearth furnace, in which the upper two hearths are maintained at 400° C. and 500° C., respectively, the remainder at 600° C. The ammonia gases liberated are absorbed in a portion of the acid mother liquor formed in the basic ammonium alum precipitation.

The hot calcine discharged from the furnace is cooled and then mixed with gentle stirring, with 1.25 parts by weight of 48° Baumé sulphuric acid, in a jacketed kettle, keeping the mixture at a temperature of 20° C. or less by passing cold water through the jacket. After ten minutes of stirring, the mixture is poured on a warmed plate. A slight rise of temperature at one point is sufficient to start the reaction which spreads rapidly throughout the entire mass, and which is so strongly exothermic that a temperature of 450° C. is reached at some points.

The reaction mixture is cooled and broken into lumps. It is ready for use in the arts, although for some uses it is desirable to grind the lumps in a pulverizer. The aluminum sulphate prepared using the proportions above mentioned of basic aluminum sulphate and sulphuric acid, will be a substantially anhydrous aluminum sulphate containing a small percentage of soluble basic alumina and a small percentage of insoluble matter, within the limits of commercial specifications.

Having now described the invention, what is claimed as new and desired to secure by Letters Patent, is:

1. The method of treating a basic ammonium alum having approximately the composition 33.5% $Al_2O_3$; 3.6% $NH_3$; 43% $SO_3$; 16.9% $H_2O$, to produce therefrom a basic sulphate of alumina of such character that it will be reactive with sulphuric acid, which consists in heating a finely divided basic ammonium alum to a temperature of 400° C. but not exceeding 620° C. for a sufficient time to dissociate and drive off the ammonia constituent of the alum.

2. The process as described in claim 1, in which the basic aluminum sulphate is treated to reduce its basicity and increase its solubility by mixing the basic sulphate with sulphuric acid and bringing about a reaction between the two.

3. The method of treating a basic ammonium alum to produce therefrom a soluble and substantially anhydrous aluminum sulphate, which consists in heating the basic ammonium alum to temperatures which will volatilize and eliminate the ammonia constituent of the alum and produce therefrom a highly basic anhydrous sulphate of alumina, then mixing the basic sulphate of alumina with sulphuric acid of such strength as will react therewith to such an extent as to produce a substantially anhydrous soluble sulphate.

4. The method of manufacturing sulphate of alumina from ores of alumina which consists in treating such ores with such preliminary treatment as may be necessary to render their contained alumina content soluble with sulphuric acid treating the ore with sulphuric acid solution in such quantity as will convert the alumina present into sulphate of alumina, adding to the material thus treated sulphate of ammonia in sufficient quantity to form with the sulphate of alumina a soluble ammonium alum, separating the ammonium alum solution from the gangue material, crystallizing therefrom ammonium alum, separating said crystals from the mother liquor, dissolving the alum crystals in water, heating the solution thus formed to temperatures of between 140° C. and 200° C. and under corresponding pressure to effect the precipitation therefrom of finely divided particles of a basic ammonium alum and the production of a mother liquor containing the sulphuric acid eliminated from the sulphate of alumina constituent of the alum, sulphate of ammonia also eliminated from the alum solution and undecomposed ammonium alum, separating the finely divided basic alum from the mother liquor, heating the basic alum to temperatures sufficient to volatilize and drive off the ammonia constituent of the basic alum but not in excess of 620° C., bringing into solution the ammonia and ammonium sulphate driven off by the heat treatment and recycling such solution together with the mother liquor produced in the formation of the basic ammonium alum in the treatment of further bodies of alumina ore.

5. The process described in claim 4 in which the ammonia and sulphate of ammonia volatilized in the heating of the basic ammonium alum is collected and dissolved in the mother liquor produced in the formation of the basic ammonium alum.

6. The process described in claim 4 in which the basic sulphate of alumina after the elimination of the ammonia constituent of the basic alum has its basicity reduced by mixing therewith sulphuric acid in such reactive proportion as will reduce the basicity of the sulphate of alumina to a desired extent.

KATHERINE STEUART,
*Administratrix of the Estate of Gordon R. Steuart, Deceased.*